United States Patent [19]

Kato

[11] Patent Number: 5,774,622
[45] Date of Patent: Jun. 30, 1998

[54] VIDEO SIGNAL RECORDING/ REPRODUCING DEVICE FOR FACILITATING RAPID SEARCHING OF THE VIDEO SIGNAL

[75] Inventor: Shiro Kato, Hirakata, Japan

[73] Assignee: Matsushita Electric Industrial Co., Ltd., Osaka-fu, Japan

[21] Appl. No.: 442,140

[22] Filed: May 16, 1995

Related U.S. Application Data

[63] Continuation of Ser. No. 22,659, Mar. 1, 1993, abandoned.

[30] Foreign Application Priority Data

Feb. 28, 1992 [JP] Japan .................................... 4-042874

[51] Int. Cl.⁶ .............................. H04N 5/91; H04N 5/93
[52] U.S. Cl. ................................ 386/68; 386/52; 386/129
[58] Field of Search .............................. 348/96, 97, 424; 358/313, 311, 312, 310, 335, 342, 339; 360/13, 14.1, 11.1, 32, 33.1; 386/52, 68, 109, 110, 5, 4, 112, 129; H04N 5/91, 5/93

[56] References Cited

U.S. PATENT DOCUMENTS

| | | | |
|---|---|---|---|
| 3,886,589 | 5/1975 | Nasu .......................................... | 386/5 |
| 4,905,077 | 2/1990 | Ishii .......................................... | 358/22 |
| 4,905,093 | 2/1990 | Satoh ........................................ | 358/335 |
| 5,119,209 | 6/1992 | Okano ....................................... | 358/339 |
| 5,126,851 | 6/1992 | Yoshimura et al. ..................... | 358/335 |
| 5,168,363 | 12/1992 | Kojima et al. .......................... | 358/183 |
| 5,206,754 | 4/1993 | Fukatsu et al. ......................... | 358/339 |
| 5,434,674 | 7/1995 | Masuda .................................... | 358/335 |

FOREIGN PATENT DOCUMENTS

| | | |
|---|---|---|
| 63-158984 | 7/1988 | Japan . |
| 63-158985 | 7/1988 | Japan . |
| 4-178903 | 6/1992 | Japan . |

*Primary Examiner*—Robert Chevalier
*Attorney, Agent, or Firm*—Ratner & Prestia

[57] ABSTRACT

A digested video signal producing device for producing digested video signals from the original video signals recorded the video tape includes a Read/Write head for reading the recorded video video sinal, a tape winding unit for positioning the video tape to predetermined recording positions with respect to the Read/Write head, a reproduction circuit for reproducing the original video signal, a decimating circuit for producing a digested signal by sampling the reproduced original video signal every other predetermined even number of fields, a storage circuit for storing thus obtained digested video signals, and a control unit for control overall operation of the device. When producing the digested video signal, the video tape is positioned to the first recording area where the original video signals are recorded. Sampled digested video signals are repeatedly stored in the storage circuit until the storage circuit is full. Then the video tape is rewound to a second recording area for recording thus obtained digested video signals.

25 Claims, 4 Drawing Sheets

VIDEO SIGNAL RECORDING/ REPRODUCING DEVICE FOR FACILITATING RAPID SEARCHING OF THE VIDEO SIGNAL

This application is a continuation of application Ser. No. 08/022,659 filed Mar. 1, 1993 now abandoned.

BACKGROUND OF THE INVENTION

1. Field of the Invention

The present invention relates to a digested video production device for producing a digested video signal representing digested of the original video images recorded on a recording media and, more particularly, to the device for recording the digested video signal in a part of the recording medium with the original video signals recorded therein and reproducing the digested vide signals, enabling it to know the location of desired original image with respect to the recording medium quickly.

2. Description of the Prior Art

Video cassette recorders, or VCRs, are widely available and commonly used today for image recording and reproducing. VCRs with high speed playback functions enabling quick review of the contents recorded to tape and quick searching for a known position offer extra convenience and are widely available. With the extended recording times made possible by improvements in recording density, these high speed playback functions are even considered essential by many video users.

The maximum speed of the high speed playback functions of currently available VCRs is several dozen times the normal playback speed in consumer VCRs, and about one hundred times the normal playback speed in broadcast VCRs.

There are several practical reasons why the maximum playback speed cannot be further increased, including the excessive load placed on the tape, motor, and other components by higher speeds, and the instability of the playback signal. This means it is also difficult to review the recorded content of a tape and to find the desired images in less time. While even higher speed scanning and search capabilities can be to achieved, the cost of the VCR would be extremely high.

These problems are even more complicated in digital VCRs, which record a digital signal. Digital VCRs detect a synchronization pattern that is needed to correctly read the data. If a stable synchronization signal cannot be obtained, the data cannot be correctly reproduced. High speed playback is therefore even more difficult compared with an analog VCR. An example of the high speed playback device used in the digital VCR is proposed by Japanese Laid-open Patent Publication No. 4-178903 published Jun. 25, 1992. The video tape is divided in two elongated recording areas extending in the longitudinal direction thereof. First area is used for recording the original video signals in digital data. The other area is used for digitally recording the high-speed playback video signal representing the outline of the original video signals repeatedly. Since the high-speed playback video signal is repeatedly recorded in the second area, the entire recording efficiency is reduced. Furthermore, a stable synchronization of signals is required for digital playback. To obtain the image reproduced at a high speed one hundred times as great as the recording speed, the recording tape must be stably driven with the same high speed.

Japanese Laid-open Patent Publications No. S63-158984 and S63-158985 disclose devices used to record still pictures representing the contents of the video image recorded in the video tape as caption image thereof. Specifically, when reproducing the recorded images from the video tape in which, for example, nine programs of images are recorded thereon, the user selectively samples one each caption image from the nine program images. These nine of sampled images are written in the digital memory, and then read out therefrom later as still-pictures. Each of these nine of still pictures is recorded in a "table of contents" at the beginning of the tape for several seconds. This means that each of nine sampled pictures is repeatedly recorded so that only the same still pictures appears for several seconds.

However, before obtaining these still caption images, the user must reproduce the original images recorded on the video tape and selects the image captioning the contents thereof, it is bothersome task. Furthermore, only a limited number of sampled images can be recorded in the table of contents, making it difficult to readily confirm the precise contents, for example, of the programs or drama recorded on the tape. In addition, the recording medium is not efficiently used because the sampled images are recorded as still images, which are not equivalent to the images obtained with high speed playback.

Conventional video signal decimation methods typically sample images using single frames or by sampling only the even or odd fields. With the frame decimation method, however, the field-field distance is not equal, and with the field decimation method the resulting video signals will not yield a normally interlaced imaged.

SUMMARY OF THE INVENTION

The object of the present invention is therefore to provide a digested video signal producing device which solves these problems.

In order to achieve the aforementioned objective, a digested video signal production device comprises reproducing means for reproducing a first video signals recorded on a first predetermined recording portion of a recording medium; sampling means for sampling a portion of said reproduced first signal every other predetermined number of field to produce a second video signal; and storage means for sequentially storing each of said second video signals a predetermined number times and sequentially transferring each of said second video signals stored therein when required.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

First Embodiment

Figure 1:
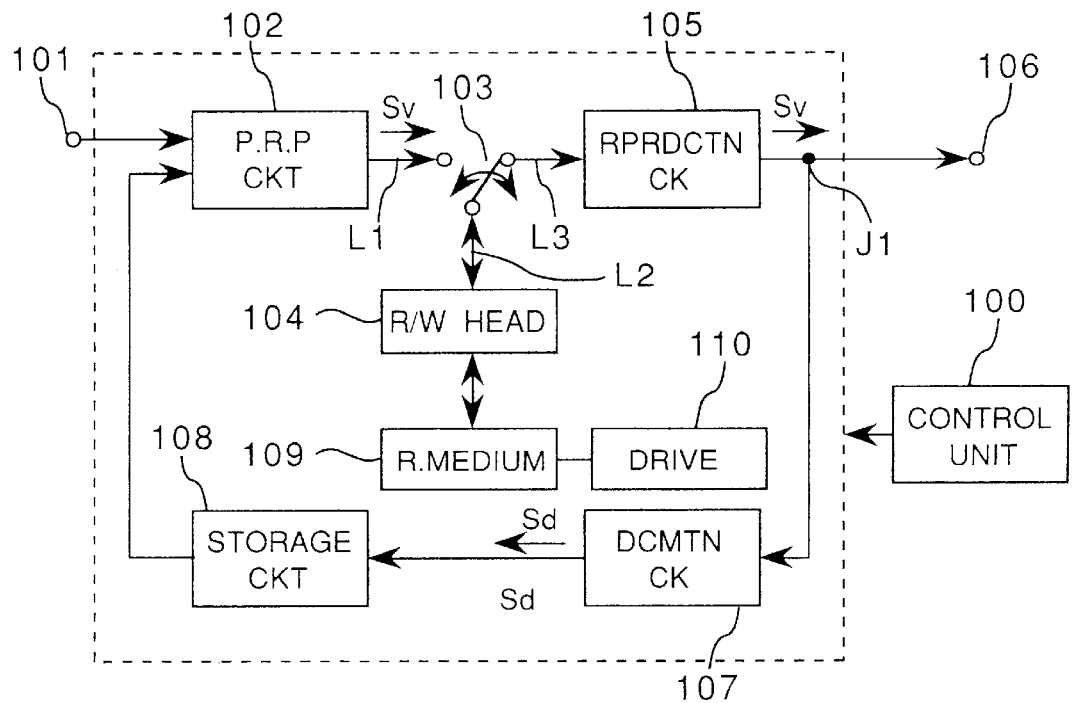
FIG. 1 is a block diagram of a digested video image production device according to the present invention.

Referring to FIG. 1, a block diagram of a digested video image production device according to a first embodiment of the present invention is shown. The digested video image production device includes a pre-recording processing circuit 102 for applying a digital video signal coming through an input 101 with a pre-recording process such as error-correction coding and modulation, and outputting the original video signal Sv through a line L1. The digested video image production device further includes a switch 103 for selectively connecting either one of line L1 and a line L3 with a line L2. A R/W head 104 writes the video signal Sv coming through the lines L1 and L2 connected by the switch 103 on a recording medium 109 and reads out them therefrom. As an example of the recording medium 109, a video tape or a magnetic tape is used in this embodiment. A driving unit 110 is provided to winding the video tape 109 for recording or reading out the signals therefrom. A reproduction circuit 105 reproduces the original video signal Sv based on the video signal read out from the video tape 109 by applying demodulation and error-correction thereto, and such a reproduced video signal Sv is output from an output terminal 106 through a junction J1. A decimation circuit 107 is connected to the junction J1 for decimating the reproduced video signal Sv by sampling the fields (or frames) at a predetermined interval to generate digested video signals Sd. A storage circuit 108 is connected to the decimation circuit 107 for temporarily storing the digested video signals Sd therein, and is further connected to the pre-recording processing unit 102. A control unit 100 is provided to control the overall operation of digested video image production device and is comprised of, for example, a micro computer.

The control unit 100 includes three pointers (registers) P0, P1, and expressing positions on the video tape 109 with respect to the length of the tape 109. First pointer P0 indicates the current position of the video tape 109 in contact with the R/W head 104, P1 indicates the starting position from which the playback of originally recorded video signal Sv starts or resumes after quitting, and P2 indicates the recording start position of the digested video image signal Sd.

The control unit 100 further includes a buffer write counter BW for counting the times that the digested video image signals Sd is written to the storage circuit 108, and a buffer read counter BR for counting the times that the digested video image signals Sd is read out from the storage circuit 108.

In normal recording operation, the video signal input from the input terminal 101 is processed by the pre-recording processing circuit 102 for recording, and then passes through the lines L1 and L2 connected by the switch 103 to the R/W head 104, and is thereby recorded to the video tape 109.

In normal reproducing operation, the signal picked up by the R/W head 104 from the video tape 109 is input through the lines L2 and L3 connected by the switch 103 to the reproduction circuit 105, converted to the video signal Sv by the reproduction circuit 105, and output from the output terminal 106.

Figure 6:
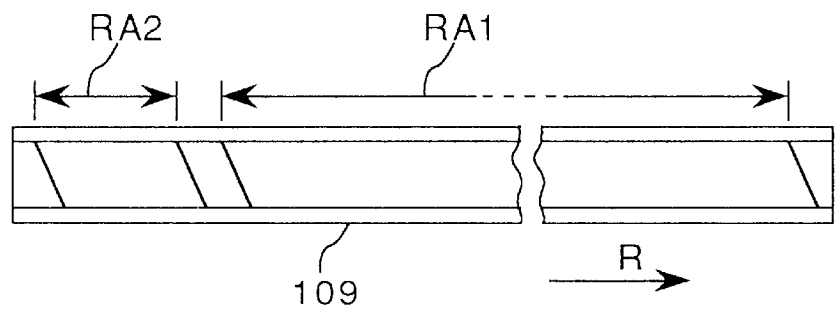
FIG. 6 is a plan view showing a video signal recording medium in tape form with the digested video image signal recorded therein by the digested video image production device shown in FIG. 1.

Referring to FIG. 6, an example of the video tape 109 recorded by the digested video image signal production device according to the present invention is shown. The video tape 109 is formed with first and second recording areas RA1 and RA2 to which the original video image signals Sv and digested video image Sd are recorded, respectively. As shown in FIG. 6, the second recording area RA2 is preferably located at the beginning with respect to the recording direction shown by arrow R, before the first recording area RA1. However, the second recording area RA2 can be formed on other position than the beginning of the tape 109, for example, a portion after the first recording area RA1.

Figure 7:
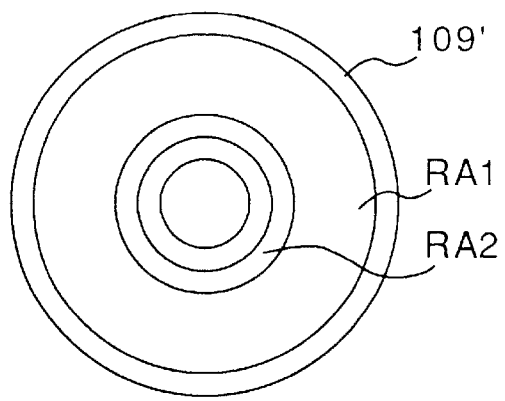
FIG. 7 is a plan view showing a video signal recording medium in disk form with the digested image signal recorded therein by the digested video image production device shown in FIG. 1.

Although the present embodiment has also been described with reference to a digital VCR, the invention shall not be so limited and will be obviously adaptable to an analog VCR or to a digested video image production device using a disk-shaped recording medium 109', as shown in FIG. 7. The disk-shaped recording medium 109' differs from the tape 109 shown in FIG. 6 in shape alone, and further description is therefore omitted.

Figure 5:
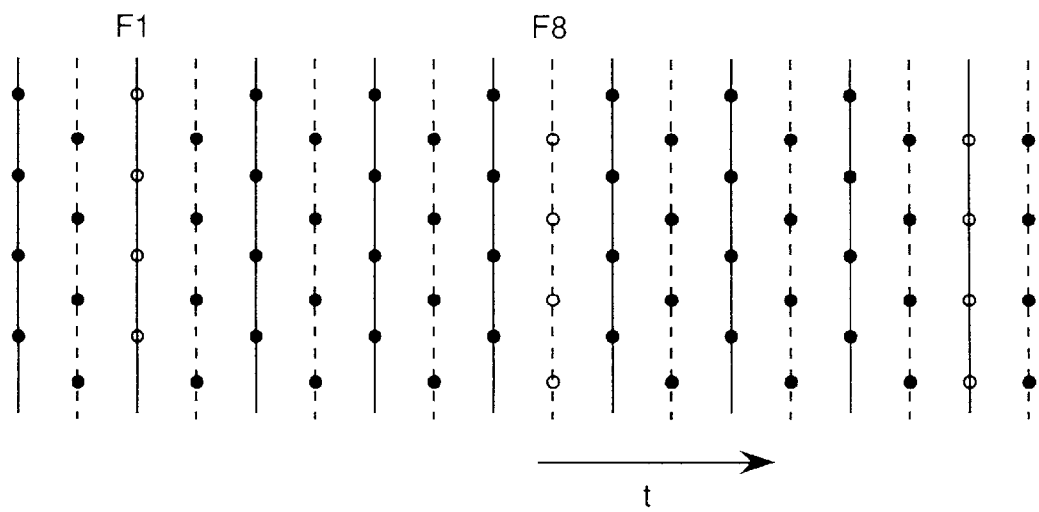
FIG. 5 is an illustration of assistance in expiation of the video signal field decimation operation by the digested video image production device shown in FIG. 1.

Referring to FIG. 5, a concept of field decimation operation performed by the decimation circuit 107 shown in FIG. 1 is shown. The white and solid dots in FIG. 5 indicate the lines of each field, solid lines indicate odd fields, and dotted lines indicate even fields. The horizontal axis expresses time (field position). The lines with white dots are the fields sampled by the decimation process, and the lines with solid dots represent the discarded fields. In the video signal field decimation method of the invention, an odd number of fields is the field interval of un-decimated (sampled) fields. For the sake of brevity, sampling interval is seven (F=7) in FIG. 5. In this case, at first, the odd field F1 is sampled from the video signals Sv. From the second to sixth fields from the first field F1 are discarded, and then the seventh filed F8, even field, from the first field F1 is sampled form the video signals Sv. By sampling the fields at an interval of odd number such as seven, the digested video signal Sd resulting from this decimation process will comprise alternating even and odd fields as in a normal video signal, maintaining the interlaced relationship. Therefore it is possible to record the digested video signal Sd with the same process used for the original video signal Sv.

It is therefore possible by means of the present invention to obtain a digested video signal Sd of picture frames (fields) from a pre-recorded original video signal Sv by decimation thereof and to record this digested video signal Sd to the beginning of the video tape 109. By then reproducing the digested video signal Sd, the contents of the original video signal can be quickly known. More specifically, an image (digested video signal Sd) equivalent to reproducing the original video signal Sv at F-times the normal playback speed can be viewed because the digested video signal Sd is reproduced at normal playback speed without requiring any special mechanisms. It is also possible to move rapidly to the desired image (the position of the original video signal Sv) by referencing the position information recorded with the digested video signal Sd.

Figure 9:
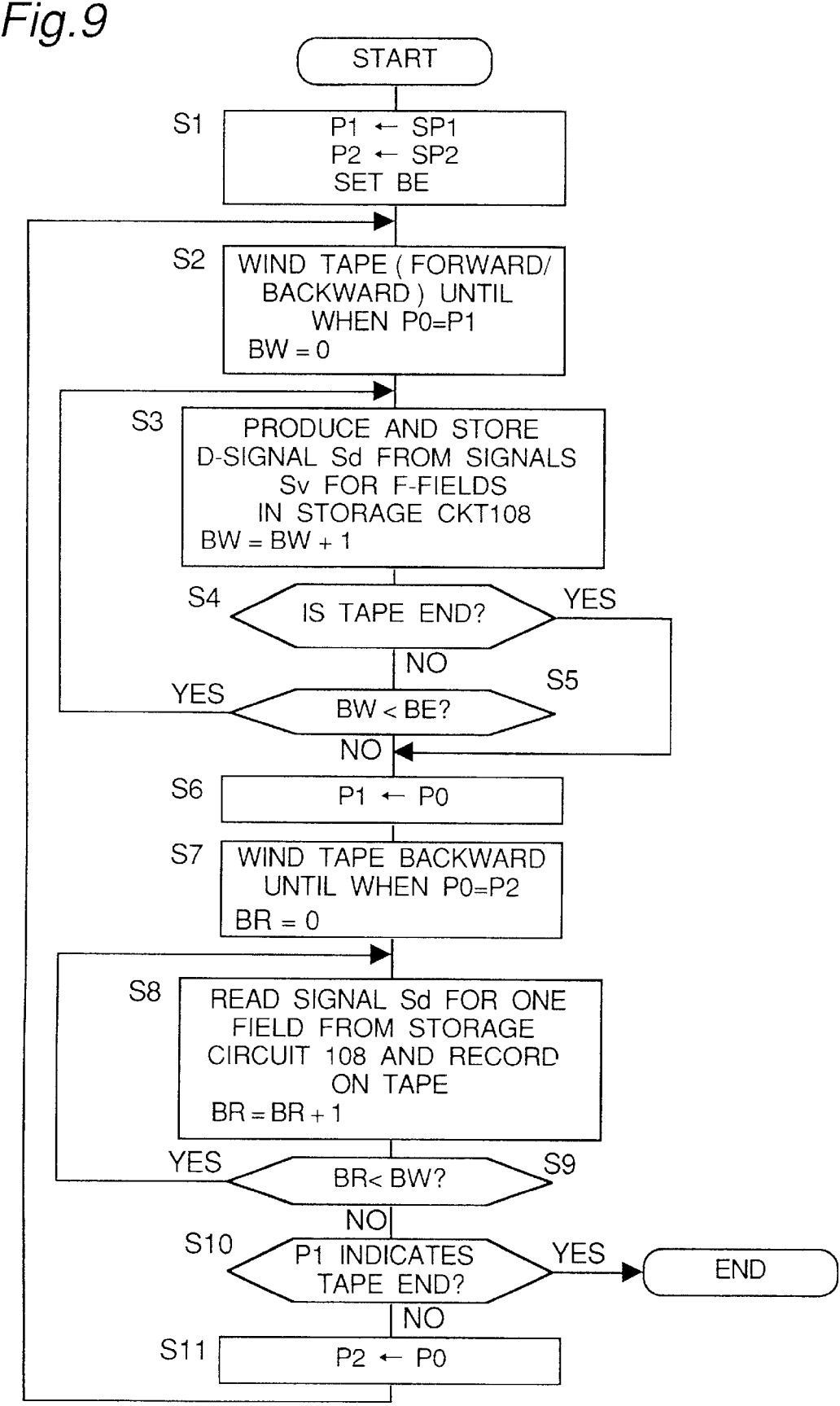
FIG. 9 is a flow chart of a main control routine to be executed by the control unit of the digested video image production device shown in FIG. 1.

Referring to FIG. 9, a flow chart of the digested video signal producing operation of the device shown in FIG. 1 is shown. The operation is applied to the recording medium 109, for example a video tape to which the original video image is already recorded in a manner described above.

At step S1, pointers P1 and P2 are set to SP1 and SP2, respectively. SP1 indicates a starting position of the first recording area RA2 where original video signal Sv is recorded, and SP2 indicates a starting position of the second recording area RA2 to which the digested video image Sd will be recorded. These position can be decided by the user or the control unit 100. The second recording area RA2 is preferably located at the unrecorded area of the video tape, for example, the beginning of the video tape. The control unit 100 calculates a maximum field number BE of digested video images signals which can be stored in the storage circuit 108 based on the capacity of the storage circuit 108, the field decimation rate, and data compression rate.

At step S2, the video tape 109 is rewound or advanced by the driving unit 110 to the position indicated by pointer P1. The buffer write counter BW is reset.

At step S3, the original video image signals Sv recorded on the video tape 109 are reproduced sequentially. The decimation circuit 107 extracts a field after every F fields (where F is an integer) in reproduced original video signal Sv and generates a digested video signal Sd. Thus generated digested signal Sd is stored in the storage circuit 108. A tape position information Pg for each extracted field is sequentially obtained from the pointer P0. Then the buffer write counter BW is incremented by one.

At step S4, it is judged whether the video tape is wound by the driving unit 110 to the end or not. When it is "YES", the reproduction of the original video signal Sv from video tape 109 stops, and the operation advances to step S6. When it is "NO", the operation advances to next step S5 where it is judged whether the buffer write counter BW is smaller than the maximum field number BE of the buffer or not.

At step S5, when it is judged "YES" meaning that there are still some space for storing the digested video signals Sd in the storage circuit 108, the operation returns to step S3. When it is "NO", i.e., the storage circuit 108 is filled with the digested video image signals Sd, the operation advances to step S6 after stopping the reproduction of the video signal Sv. Thus, the digested video image signal Sd is repeatedly produced from original video signals Sv for F-fields and recorded in the second recording area RA2 (at step S3) until when the video tape 109 ends (at step S4) or when the storage circuit 108 becomes full with the digested video signals Sd (at step S5).

At step S6, the control circuit 100 sets the current position information of P0 to pointer P1 and stores it. It is to be noted that the pointer P1 indicates the current tape position from which reproduction of the original video image signal Sv should start again.

At step S7, the video tape 109 is rewound by the driving unit 110 to the position indicated by pointer P2, i.e., the position of the second recording area RA2 from which the digested video image signals Sd are recorded. The buffer read counter BR is reset.

At step S8, the digested video signals Sd for one field is read out from the storage circuit 108 and transferred to the pre-recording process circuit 102. The digested video signal Sd is processed by the pre-recording processing circuit 102 for recording, and then passes through the lines L1 and L2 connected by the switch 103 to the R/W head 104, and is thereby recorded to the second recording area RA2 of the video tape 109. Then, the buffer read counter BR is incremented by one.

At step S9, it is judged whether the buffer read counter BR is smaller than the buffer write counter BW or not. When it is "YES", meaning that there are still some digested video image signal Sd left in the storage circuit 108, the operation returns to step S8. When it is "NO", meaning that all digested video signals Sd are read out from the storage circuit 108 and recorded on the video tape 109, the storage circuit 108 is cleared and then the operation advances to step S10. It is to be noted that the buffer read counter BR is not compared with the maximum field number BE but the buffer write counter BW, because the buffer write counter BW represents the maximum filed number BE when it is judged "YES" at step S4. Thus, all the digested video image signals Sd stored in the storage circuit 108 are repeatedly read out and recorded to the video tape 109.

At step S10, it is judged whether the pointer P1 indicates the tape end or not. When it is "YES", i.e., the tape 109 is wound by the driving unit 110 to the end, the tape 109 is stopped and the operation terminates. When it is "NO", meaning that the original video image signal Sv may still be recorded on the tape 109, the operation advances to step S11.

At step S11, the pointer P2 is set to the current tape position P0, i.e., the tape position identifying the point from which recording the next digested video signal Sd should start is stored. Then, the operation returns to step S2 to further produce the digested image signals Sd from the original video images stored in the rest of the tape 109.

Repeating steps S1 through S11 produces the digested video image signals Sd from the original video image signals Sv recorded on the video signal and such produced digested video signals Sd are recorded to video tape 109.

Through this operation, the digested video signals Sd of decimated picture frames (fields) is extracted from the prerecorded original video image signals Sv and recorded to the beginning of the recording medium. It should be noted that it is not necessary to extract one field at precisely every F field interval from the original video image signal Sv in step S3, and the digested video image signal can be obtained by intermittently fast forwarding and reproducing the necessary one field at the predetermined interval.

Figure 2A:
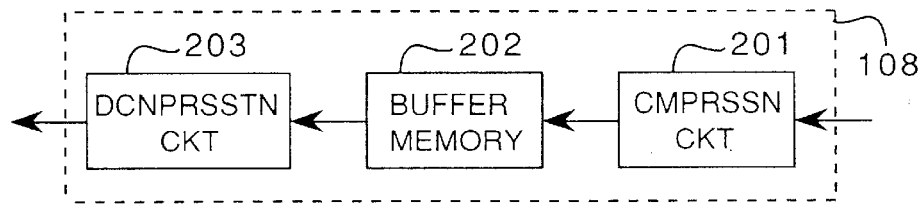
FIGS. 2A and 2B are block diagrams of the storage circuits of the digested video image production device shown in FIG. 1.

Referring to FIG. 2A, a block diagram of the storage circuit 108 of FIG. 1 is shown. The storage circuit 108 includes a compression circuit 201, a buffer memory 202, and a decomposition circuit 203. The compression circuit 201 compresses the data of the digested video image signals Sd to 1/N (where N is a number greater than 1). The buffer memory 202 stores the compressed data of digested video signal Sd. The decomposition circuit 203 reverses the process performed by the compression circuit 201 on the data from the buffer memory 202 and reproduces the digested video image signal Sd as an output from the storage circuit 108 when requested.

The digested video signal Sd is input from the decimation circuit 107 to the compression circuit 201 for data compression to 1/N, and is then stored in the buffer memory 202. Therefore, N times as much as the data of digested signals Sd can be stored in the buffer memory 202 when compared with the case storing data directly to the buffer memory 202. It is needles to say that increasing the storage capacity of buffer memory 202 increases the data amount of digested video which can be stored.

It is to be noted that the compression by the compression circuit 201 can be performed by either of a sub-sampling method and a high efficiency coding method such as Differential PCM and Adaptive DCT coding or a combination thereof. The sub-sampling method is one of pixel decimation method. When combining, for example, the Adaptive DCT coding whose compression factor is 1/20 and the subsampling method by which number of pixels in the video signals are reduced to 1/16 by decimating pixels to 1/4 horizontally and vertically and the Adaptive DCT coding whose compression factor is 1/20, the data of video image signal Sv can be compressed to 1/320. In this case, the digested video image signal Sd for 320 fields can be stored in the store circuit 108 even if the buffer memory 202 has the capacity for one field only. This means that the digested video image signals Sd for approximately 5.3 seconds (320 fields/60 fields per second) can be stored in the storage circuit 108 having one-field capacity.

Furthermore in the above described combination of data compression of 1/320, when the digested video signal Sd is obtained by sampling one field after every 101 fields (F=101) from the original video signal Sv, a digested video signals Sd corresponding to the original video signals Sv for approximately 9 minutes (320 fields×101÷60 fields per second÷60 seconds/minute) can be stored in the storage circuit 108 at the same time. Repeating fourteen times (120 minutes÷9 minutes) of the operation from steps S2 to S11 enables to obtain the digested video signals Sd for approximately 1.2 minutes (120 minutes÷101) corresponding to the original video signals for 120 minutes.

When the digested video signal Sd is obtained by sampling one field after every 101 fields from the original video signal Sv, as described above, video signals equivalent to or corresponding to the video images obtained by reproducing the original vide signals Sv at 101 times normal playback speed can be obtained by normal playback of the second area of the video tape, i.e., the beginning of the video tape 109. Because the tape position information Pg is also recorded for each field of the digested video signal Sd, the video tape 109 can be rapidly advanced to the position of the source video signal Sv by simply referencing this position information. In other words, a search capability is also achieved. The second video signal is also recorded in essentially the same recording format as the first video signal. As a result, this second video signal can be reproduced using a conventional digested video image production device with much of the same effect.

Figure 2B:
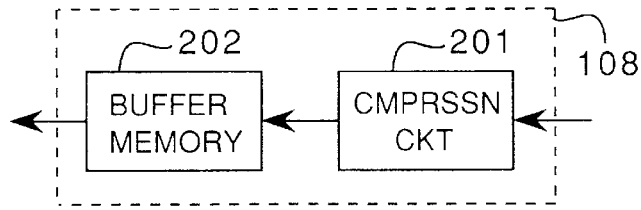

Referring to FIG. 2B, an alternation of the storage circuit 108 is shown, in which the decomposition circuit 203 is removed. This storage circuit 108 can be used when the pre-recording processing circuit 102 is constructed to compress and record the video signals Sv input from the input terminal 101, and the reproduction circuit 105 is constructed to reproduce the original video signal Sv by expanding the compressed video signal read out from the video tape 109 by the R/W head 104. In this case, since the digested video signal Sd is already compressed by the compression circuit 201, the output form the buffer memory 202 can be input directly to the pre-recording processing circuit 102, and the decomposition circuit 203 can be eliminated. The basic operation of this storage circuit 108 is the same as that in FIG. 2A above, and further description is therefore omitted.

Figure 3:
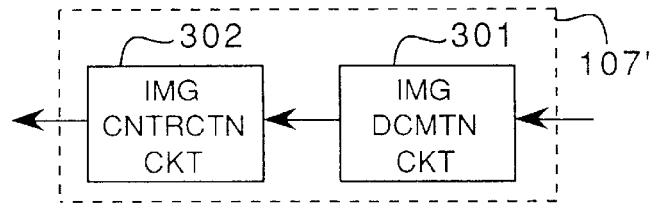
FIG. 3 is a block diagram of an alternation of the decimation circuit of the digested video image production device shown in FIG. 1.
Figure 8:
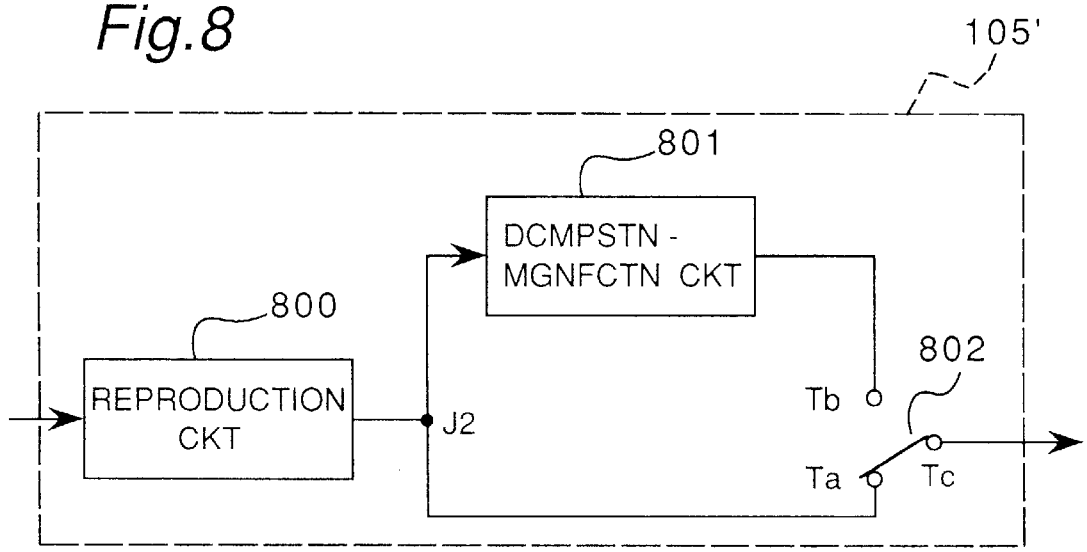
FIG. 8 is a block diagram of an alternation of the reproducing circuit of the digested video image production device shown in FIG. 1.

With reference to FIGS. 3 and 8, a second embodiment of the present invention is described. Specifically, in this embodiment, the production circuit 105 and decimation circuit 107 shown in FIG. 1 are replaced by a reproduction circuit 105' shown in FIG. 8 and decimation circuit 107' shown in FIG. 3.

As shown in FIG. 3, the decimation circuit 107' includes an image decimation circuit 301 for sampling the fields of the original video signal Sv every F fields, and an image contraction circuit 302 for compressing each field image to 1/M and outputting the digested video image signal Sd. It is to be noted that the the decimation circuit 107 shown in FIG. 1 can be used for the image decimation circuit 301. The image decimation circuit 301 decimates picture elements in the picture fields at a predetermined interval to effectively compress the image. The image contraction circuit 302 contracts the decimated picture fields, and synthesizes thus obtained contracted pictures to obtain a single of multi-image signal combining multiple images. Thus obtained multi-image signals are recorded to the video tape 109 in the same as described with reference to FIG. 1.

It is obviously preferable for the second area RA2 to which the digested video signal Sd is recorded to be as short as possible. Therefore, the decimation circuit 107 obtains the compressed picture frames (fields) 1/M the size of the field decimated signal by compressing the sampled image vertically and horizontally, obtaining multiple images by combining M decimated images, and outputting the result as the second video signal Sd. Note that this is a form of data compression, and can be achieved by means of a decimation circuit 107. Because the number of fields in the second video signal is thus reduced to 1/M, the area to which the second video signal is recorded can also be reduced to 1/M.

Figure 4:
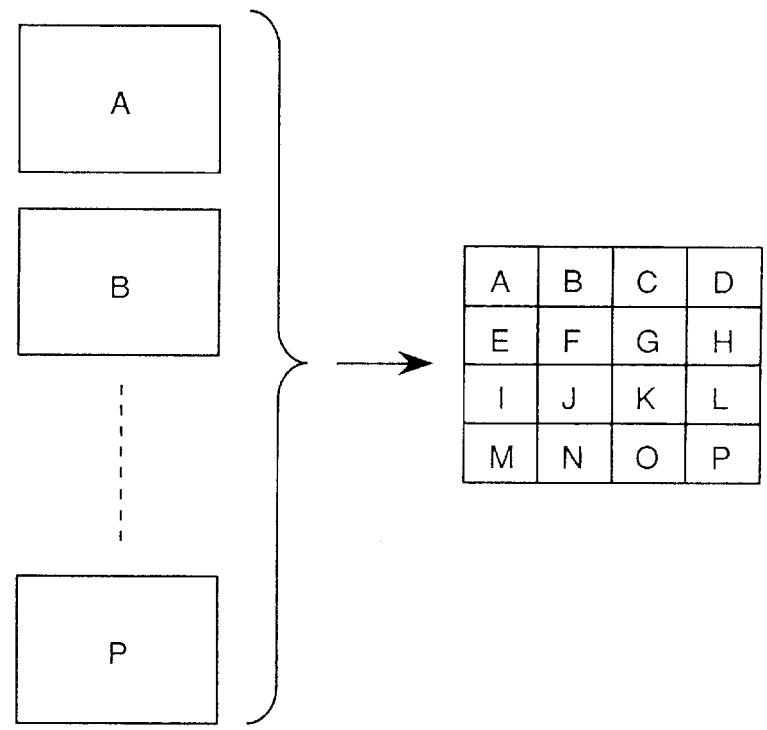
FIG. 4 is an illustration of assistance in explanation of the image compression and composite operation by the digested video image production device shown in FIG. 1.

In FIG. 4, the concept of single image combining multiple images obtained by the image contraction circuit 302 are shown. The sixteen field images A, B, . . . P on the left side of FIG. 4 are reduced to 1/16 and combined to form a single field image combining multiple images as shown on the right. During reproduction the digested video signal Sd can be output to display this synthesized image. But a circuit for splitting the synthesized image into the original image elements and enlarging each to the original field size during the reproduction process can also be added, which will be described below.

Referring to FIG. 8, a reproduction circuit 105' includes a reproduction circuit 800 which reproduces the multi-image signals from the video signals read out from tape 109 in the same manner as reproduction circuit 105 of FIG. 1 and out put it to a junction J2. A decomposition-magnification circuit 801 is connected to the junction J2 to receive the reproduced multi-image signals. The decomposition-magnification circuit 801 reverses the process performed by the image contraction circuit 302 and separates the reproduced multi-images into single images, i.e., the video signals for sixteen pictures are produced from a single multi-image signal. Therefore, the decomposition-magnification circuit 801 reproduces the pictures at a speed of 1/16 of the normal reproduction. A switch 802 has two terminals Ta and Tb connected to the junction J2 and the output of the decomposition-magnification circuit 801, respectively, and an output terminal Tc.

When the switch connects terminals Tb and Tc, single image signals are output form the reproduction circuit 105'. When the switch connects terminals Ta and Tc, the multi-images signals are output. Thus, single image signal and multi-images signal are selectively output by the operation of switch 802. buffer memory 202 and reproduce the original digested video image signal Sd as an output from the storage circuit 108 when requested.

If the field decimation frequency F is 101 when generating the second video signal and the recording time of the first video signal is 120 minutes, the recording time of the second video signal is 120/101=1.2 minutes, a very short time. In addition, if the second video signal is recorded using the synthesized multiple image described above and the compression ratio 1/M is 1/16, the recording time for the second video signal can be further reduced to approximately 4.5 seconds.

It is therefore possible by means of the present invention to obtain a digested video signal Sd of picture frames (fields) from a pre-recorded video signal Sv by decimation thereof, and to record this digested video signal Sd to the beginning of the video tape 109. By then reproducing the digested video signal Sd, the contents of the video signal Sv can be quickly known. More specifically, an image (digested video signal Sd) equivalent to reproducing the original video signal Sv at F-times the normal playback speed can be viewed because the second video signal is reproduced at normal playback speed without requiring any special mechanisms. It is also possible to move rapidly to the desired image (the position of the original video signal Sv) by referencing the position information recorded with the digested video signal Sd.

When the recording processing circuit 102 compresses and records the input video signal, the compression circuit 201 shown in FIGS. 2A and 2B can share the compression circuit built in to the recording processing circuit 102. The decomposition circuit 203 can share the decomposition circuit in the reproduction circuit 105, and the buffer memory 202 can share the frame memory, and the scale of the circuitry required to achieve the present invention can be reduced. When even more second video signals are stored in the buffer memory 202 by compressing the data to less than the data normally recorded, processing can be made even more efficient.

The digested video signal Sd is obtained by field decimation of the original video signal Sv in the embodiments described above, but the digested video signal Sd can also be obtained by frame decimation. It is also possible to sample pixels at a predetermined frame interval or sample a predetermined number of pixels at a predetermined frequency from every fields to synthesize a digested video signal Sd (field or frame). For example, when synthesizing one of digested video signal Sd at every 101 fields of the original video signals Sv, N-th fields is sampled from the N-th pixel on the interval of 101 fields. Before decimation, an image filter (spatial filter) or temporal filter can be applied.

In addition, the position to which the digested video signal Sd is recorded is not limited to the beginning of the video tape as described above, and the digested video signal Sd can be recorded to an area at the end of the tape or at one or more areas in the middle of the tape (for example, between plural programs recorded to a single tape).

Furthermore, the difference between the first video signal and the second video signal has been described as the addition of position information to the second video signal, but this position information can be easily omitted. This is because if the second video signal is obtained by sampling every 101st field from the first video signal, the general position of the first video signal corresponding to the desired field image can be obtained by simply multiplying the position of the field image in the second video signal by 101. In other words, the first and second video signals can be recorded with the same recording format. It will also be obvious that a special recording format distinct from that of the first video signal can be used for the second video signal.

The present embodiment has also been described with reference to that first and second recording area RA1 and RA2 formed in a single recording medium at the same time. However, first and second recording area RA1 and RA2 can be obviously separated. For example, a single recording media cartridge containing a plurality of recording media therein is used as the first recording area RA1 and the semiconductor memory can be used as the second recording area RA2.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digested video signal producing device comprising:

reproducing means for reproducing a first video signal previously recorded on a first predetermined portion of a recording medium and for outputting said reproduced first video signal;

sampling means for receiving only said reproduced first video signal and periodically sampling a predetermined number of continuing fields of said reproduced first video signal at a predetermined number of fields, F, to produce a second video signal, said second video signal representing a motion image equivalent of the first video signal at a rate of F divided by the predetermined number of continuing fields times a normal playback speed, said predetermined number F being greater than one, the sampling means counts the number of fields in the reproduced first video signal based on vertical blanking periods and, each time the predetermined number F of fields is reached, the sampling means samples the predetermined number of continuing fields of the reproduced first video signal; and storage means for storing said second video signal and for transferring said stored second video signal when desired.

2. A digested video signal producing device as claimed in claim 1, further comprising recording means for receiving said second video signal, previously stored and transferred, and for recording said second video signal to a second predetermined portion, separate from said first predetermined portion, of said recording medium to enable quick location of a desired image in said first video signal, wherein said first and second predetermined portions are separated in the time axis direction on said recording medium.

3. A digested video signal producing device as claimed in claim 2, further comprising a driving means for driving said recording medium such that said recording means locates on said second predetermined recording portion for recording said second video signals thereto.

4. A digested video signal producing device as claimed in claim 1, wherein said storage means comprises:

compressing means for compressing said second video signal;

buffer memory means for storing said compressed second video signal; and decompressing means for decompressing said compressed second video signal to reproduce said second video signals therefrom.

5. A digested video signal producing device as claimed in claim 1, wherein said sampling means comprises:

pixel sampling means for sampling only said reproduced first video signal at the predetermined number of fields F to produce and output said second video signal; and synthesizing means for combining said second video signal into a multi-image picture signal.

6. A digested video signal producing device as claimed in claim 5, wherein said reproducing means comprises:

multi-image reproducing means for reproducing and outputting said multi-image picture signal; and multi-image separating means for producing single image signals from said reproduced multi-image picture signal by separating said reproduced multi-image picture signal.

7. A digested video signal producing device as claimed in claim 6, wherein said reproducing means further includes a switch means for selectively passing one of said reproduced multi-image picture signal and said single image signal.

8. A digested video producing device as claimed in claim 1, wherein said predetermined number is an odd number, whereby any two adjacent picture fields in said second video signal are an odd field and an even field.

9. A digested video producing device as claimed in claim 3, wherein said recording medium is a video tape having first and second recording areas, said first video signal being recorded on said first recording area and said second video signal being recorded on said second recording area.

10. A video signal recording medium having a recording area for recording video signals, said video signal recording medium comprising:

a first portion of said recording area where a first video signal having a first predetermined number of images is recorded; and a second portion of said recording area where a second video signal having a second predetermined number smaller than said first predetermined number of images is recorded, said second video signal being derived from said first video signal by periodically sampling a predetermined number of continuing fields of said first video signal at a predetermined number of fields, F, to produce the second video signal, said second video signal representing a motion image equivalent of the first video signal at a rate of F divided by the predetermined number of continuing fields times a normal playback speed, the periodic sampling being performed by counting the number of fields in the first video signal based on vertical blanking periods and, each time the predetermined number F of fields is reached, sampling the predetermined number of continuing fields of the first video signal, said second video signal stored in said second portion for enabling quick location of a desired image of said first video signal.

11. A digested video signal producing device as claimed in claim 1, further comprising recording means for recording said second video signal to a second predetermined portion of said recording medium.

12. A digested video signal producing device as claimed in claim 1, wherein said first video signal has a first predetermined number of images, said second video signal having a second predetermined number smaller than said first predetermined number of images.

13. A digested video signal producing device as claimed in claim 12, wherein said sampling means samples said first video signal to derive one image therefrom every predetermined number of images.

14. The digested video signal producing device according to claim 1, wherein the periodic sampling is automatically performed.

15. The video signal recording medium according to claim 10, wherein the periodic sampling is automatically performed.

16. The digested video signal producing device according to claim 1, wherein said vertical blanking period is a vertical synchronization signal.

17. The digested video signal producing device according to claim 1, wherein said vertical blanking period is a time code data.

18. The video signal recording medium according to claim 10, wherein said vertical blanking period is a vertical synchronization signal.

19. The video signal recording medium according to claim 10, wherein said vertical blanking period is a time code data.

20. A digested video signal producing device for producing a digested video signal indicating digested video images of a source video signal supplied thereto by an external video signal source, said device comprising:

sampling means for receiving said source video signal and sampling a predetermined number of continuing fields of said source video signal at a predetermined number of fields, F, to produce said digested video signal representing a motion image equivalent of said source video signal at a rate of F divided by the predetermined number of continuing fields times a normal playback speed, said predetermined number F being greater than one, said sampling means counts the number of fields in said source video signal based on vertical blanking periods and, each time the predetermined number of fields F is reached, said sampling means samples a predetermined number of continuing fields of said source video signal; and storage means for sequentially storing each of said digested video signals transferring each of said digested video signals stored therein when required.

21. The digested video signal producing device of claim 20, wherein said vertical blanking period is a vertical synchronization signal.

22. The digested video signal producing device of claim 20, wherein said vertical blanking period is a time code data.

23. The digested video signal producing device according to claim 1, wherein the predetermined number of continuing fields sampled by the sampling means is not less than one.

24. The video signal recording medium according to claim 10, wherein the predetermined number of continuing fields periodically sampled is not less than one.

25. The digested video signal producing device according to claim 20, wherein the predetermined number of continuing fields sampled by the sampling means is not less than one.

* * * * *

UNITED STATES PATENT AND TRADE MARK OFFICE
CERTIFICATE OF CORRECTION

PATENT NO. : 5,774,622
DATED : June 30, 1998
INVENTOR(S) : Kato

It is certified that error appears in the above-identified patent and that said Letters Patent is hereby corrected as shown below:

On the Cover Page, item [57], please delete the Abstract in its entirety and replace with:

> A digested video signal producing device for producing digested video signals from original video signals recorded on video tape includes a Read/Write head for reading a recorded video signal, a tape winding unit for positioning the video tape to predetermined recording positions with respect to the Read/Write head, a reproduction circuit for reproducing the original video signal, a decimating circuit for producing a digested signal by sampling the reproduced original video signal every other predetermined even number of fields, a storage circuit for storing thus obtained digested video signals, and a control unit for controlling overall operation of the device. When producing the digested video signal, the video tape is positioned to the first recording area where the original video signals are recorded. Sampled digested video signals are repeatedly stored in the storage circuit until the storage circuit is full. Then the video tape is rewound to a second recording area for recording thus obtained digested video signals.

Signed and Sealed this

Ninth Day of March, 1999

*Attest:*

*Attesting Officer*

Q. TODD DICKINSON

*Acting Commissioner of Patents and Trademarks*